(12) United States Patent
Lin et al.

(10) Patent No.: US 11,052,404 B1
(45) Date of Patent: Jul. 6, 2021

(54) APPARATUS FOR REMEDIATION OF A COPPER AND NICKEL CO-CONTAMINATED SOIL AND A METHOD FOR USING THE SAME

(71) Applicant: ACADEMY OF ENVIRONMENTAL PLANNING & DESIGN, GROUP CO., LTD., NANJING UNIVERSITY, Nanjing (CN)

(72) Inventors: Feng Lin, Nanjing (CN); Jun Li, Nanjing (CN); Zhaoyang Lu, Nanjing (CN); Lingxiang Wang, Nanjing (CN); Shunbin Li, Nanjing (CN); Jing Chen, Nanjing (CN); Tao Zhou, Nanjing (CN); Cheng Xu, Nanjing (CN)

(73) Assignee: ACADEMY OF ENVIRONMENTAL PLANNING & DESIGN, GROUP CO., LTD., NANJING UNIVERSITY, Nanjing (CN)

( * ) Notice: Subject to any disclaimer, the term of this patent is extended or adjusted under 35 U.S.C. 154(b) by 0 days.

(21) Appl. No.: 17/256,177

(22) PCT Filed: Mar. 23, 2020

(86) PCT No.: PCT/CN2020/080665
§ 371 (c)(1),
(2) Date: Dec. 25, 2020

(87) PCT Pub. No.: WO2021/012693
PCT Pub. Date: Jan. 28, 2021

(30) Foreign Application Priority Data

Jul. 25, 2019 (CN) .......................... 201910674675.7

(51) Int. Cl.
*B02C 19/18* (2006.01)
*B02C 15/14* (2006.01)
(Continued)

(52) U.S. Cl.
CPC .............. *B02C 19/18* (2013.01); *B02C 15/14* (2013.01); *B09C 1/085* (2013.01); *B02C 23/38* (2013.01); *B02C 2019/183* (2013.01)

(58) Field of Classification Search
CPC .... B02C 19/18; B02C 2019/183; B02C 23/38
See application file for complete search history.

(56) References Cited

U.S. PATENT DOCUMENTS

| 9,120,101 B2 * | 9/2015 | Bentaj | ........................ B09B 3/00 |
| 2012/0205472 A1 * | 8/2012 | Bentaj | ..................... B02C 19/18 241/1 |

(Continued)

FOREIGN PATENT DOCUMENTS

| CN | 104646406 A | 5/2015 |
| CN | 109174931 A | 1/2019 |

(Continued)

*Primary Examiner* — Faye Francis
(74) *Attorney, Agent, or Firm* — Bayramoglu Law Offices LLC (57) ABSTRACT

An apparatus for remediation of a copper and nickel co-contaminated soil includes a housing. A crushing device is arranged at the upper part of the inside of the housing. A stirring device is arranged below the crushing device. An anode electrode and a cathode electrode are provided at both ends of the inner bottom of the housing, respectively. In the present invention, the soil contaminated by copper and nickel is first poured from the top of the crushing device, and then crushed thoroughly under the action of the crushing device. The crushed soil facilitates the movement of copper and nickel metal ions therein toward the electrodes under the action of the anode electrode and the cathode electrode, thereby achieving optimal soil remediation.

10 Claims, 6 Drawing Sheets

(51) Int. Cl.
 *B09C 1/08* (2006.01)
 *B02C 23/38* (2006.01)

(56) References Cited

U.S. PATENT DOCUMENTS

2013/0186992 A1\* 7/2013 Wellwood ............... B02C 19/18
 241/68
2017/0348700 A1\* 12/2017 Suzuki ....................... B09B 3/00
2021/0069724 A1\* 3/2021 Stark ....................... B02C 19/18

FOREIGN PATENT DOCUMENTS

| CN | 109365510 A | 2/2019 |
| CN | 110369466 A | 10/2019 |
| JP | 2008173611 A | 7/2008 |
| WO | 02072272 A1 | 9/2002 |

\* cited by examiner

APPARATUS FOR REMEDIATION OF A COPPER AND NICKEL CO-CONTAMINATED SOIL AND A METHOD FOR USING THE SAME

CROSS REFERENCE TO THE RELATED APPLICATIONS

This application is the national phase entry of International Application No. PCT/CN2020/080665, filed on Mar. 23, 2020, which is based upon and claims priority to Chinese Patent Application No. 201910674675.7, filed on Jul. 25, 2019, the entire contents of which are incorporated herein by reference.

TECHNICAL FIELD

The present invention relates to the field of soil remediation, and more specifically, to an apparatus for remediation of a copper and nickel co-contaminated soil and a method for using the same.

BACKGROUND

Soil contamination with heavy metals is typically caused by the accumulation of heavy metals that cannot be decomposed by soil microorganisms, resulting in an excessive level of heavy metal concentration in the soil. Such heavy metals at a high concentration are consequently toxic and at times fatal to animals and plants, which is very hazardous.

A variety of heavy metals can contaminate soil. For example, in the electroplating industry, the discharged effluent contains a large amount of copper and nickel, resulting in an excessive concentration level of copper and nickel metals in the contaminated soil.

At present, the heavy metal contaminated soils are typically redressed by techniques including physical remediation, chemical remediation, microbial remediation and phytoremediation. Microbial remediation and phytoremediation are energy-saving, environmentally friendly, and highly effective, but require a long remediation cycle.

SUMMARY

1. Technical Problem to be Solved

In view of the problem of poor remediation effect in the prior art, an objective of the present invention is to provide an apparatus for remediation of a copper and nickel co-contaminated soil and a method for using the same, which can achieve a good remediation effect while realizing fully-automatic remediation.

2. Technical Solution

To solve the above-mentioned problems, the present invention adopts the following technical solutions.

An apparatus for remediation of a copper and nickel co-contaminated soil includes a housing. A crushing device is arranged at the upper part of the inside of the housing.

A sliding block is connected to both sides of the middle of the outer surface of the crushing device, a slide channel matched with the sliding block is provided at the upper part of the inner wall of the housing, and the crushing device is slidably connected to the slide channel through the sliding block.

A support rod is arranged at the upper part of the inside of the crushing device, and both ends of the support rod are fixedly connected to the inner wall of the crushing device. A first motor is fixedly connected to the middle of the upper surface of the support rod, and an output shaft of the first motor penetrates the support rod and is connected to a crushing rod.

A crushing disc is arranged under the crushing rod, and the edge of the crushing disc is fixedly connected to the inner wall of the crushing device. The upper surface of the crushing disc is provided with a plurality of concentric crushing grooves, and the crushing groove is provided with a plurality of through holes. The through holes penetrate the crushing disc.

The crushing rod includes a fixed rod and a roller, and the middle of the fixed rod is fixedly connected to the bottom end of the output shaft. The roller is sleeved on both sides of the fixed rod, and the outer surface of the roller is provided with crushing teeth matched with the crushing grooves.

Gear teeth are provided on both sides of the bottom end of the outer surface of the crushing device, and the gear teeth mesh with a teeth-uncompleted gear. Two second motors are provided outside the housing, and rotating shafts of the two second motors are separately connected to the teeth-uncompleted gears.

A stirring device is arranged below the crushing device, and the stirring device includes a spiral shaft. One end of each of a plurality of stirring rods is fixedly connected to an upper side of the spiral shaft, and a lower side of the spiral shaft is connected to a spiral blade. A small housing is connected to the middle of the lower surface of the housing, and the spiral blade is located inside the small housing and contacts the inner wall of the small housing.

A feed cavity is formed inside the spiral shaft, and a horizontal rod is connected to a side of the bottom end of the spiral shaft. One end of the horizontal rod is perpendicularly connected to the spiral shaft, and the other end of the horizontal rod contacts the inner wall of the small housing. The lower surface of the horizontal rod contacts the inner bottom surface of the small housing. The horizontal rod is provided with a feed port, and the feed port communicates with the feed cavity. An auger is arranged inside the feed cavity, and the auger contacts the inner wall of the feed cavity.

The top of the feed cavity is provided with a sealing plate, and the edge of the sealing plate is fixedly connected to the inner wall of the feed cavity. A third motor is arranged on the sealing plate. The third motor penetrates the sealing plate and is connected to the top end of the auger.

A discharge port is provided at the upper part of the spiral shaft, and a rotating ring is arranged below the discharge port on the outer surface at the upper part of the spiral shaft. A rotating annular groove is provided on a side of the rotating ring adjacent to the spiral shaft. The top end of the spiral shaft is located inside a discharge bin, and a lower part of the discharge bin is located inside the rotating annular groove. A fourth motor is provided on the top end of the outer surface of the discharge bin. The fourth motor penetrates the top end of the discharge bin and is connected to the spiral shaft. The outer surface of the discharge bin is fixedly connected to the inner wall of the housing through a supporting column.

An anode electrode and a cathode electrode are provided at both ends of the inner bottom of the housing, respectively. A sluice gate device is provided between the anode electrode and the stirring rod, and between the cathode electrode and the stirring rod. The sluice gate device includes two sluice gate plates and a sluice gate. One side of the two sluice gate plates is fixedly connected to the inner wall of the housing. A sluice gate passage is provided on opposite sides of the two sluice gate plates. The bottom end of the sluice gate is slidably arranged inside the sluice gate passage, and the top end of the sluice gate is fixedly connected to the lower surface of the crushing device.

A sponge layer is connected between the bottoms of the opposite sides of the two sluice gate plates. An elastic spring and a T-shaped rod are arranged inside the sponge layer, and the T-shaped rod is located inside the elastic spring.

The housing is provided with a tapered water outlet under the anode electrode and a tapered water outlet under the cathode electrode. The water outlet is provided with a truncated cone-shaped plug. The bottom end of the T-shaped rod penetrates the lower part of the housing and is connected to the lower surface of the plug through a connecting rod.

A wastewater tank is arranged below the water outlet, and the wastewater tank is fixedly connected to the outer wall of the small housing.

The first motor, the second motor, the third motor, the fourth motor, the anode electrode and the cathode electrode are all electrically connected to a power source.

Preferably, the bottom of the sliding block and the bottom of the slide channel are fixedly connected to the two ends of a spring, respectively.

Preferably, a tapered tube is provided on the lower side of the crushing disc, and the upper part of the tapered tube is fixedly connected to the inner wall of the crushing device.

Preferably, one end of a screw conveyor is arranged inside the discharge bin. The other end of the screw conveyor penetrates the discharge bin and the housing, and then extends outward. The screw conveyor is connected to the power source.

Preferably, an opening and closing door is provided on the outer surface of the housing directly opposite to the discharge bin.

Preferably, a method for using the apparatus includes:

step (1), activating the first motor, the second motor, the third motor, the fourth motor, the anode electrode and the cathode electrode, and then pouring a dry contaminated soil from the top of the crushing device; and step (2), taking out the remedied soil from the discharge bin.

3. Advantages

Compared with the prior art, the present invention has the following advantages. In the present invention, the soil contaminated by copper and nickel is first poured from the top of the crushing device, and then the soil is crushed thoroughly by the crushing device. The crushed soil facilitates the movement of copper and nickel metal ions therein toward the electrodes under the action of the anode electrode and the cathode electrode, thereby achieving optimal soil remediation.

1, housing; 2, crushing device; 3, sliding block; 4, slide channel; 5, support rod; 6, first motor; 7, output shaft; 8, crushing disc; 9, crushing groove; 10, through hole; 11, fixed rod; 12, roller; 13, crushing teeth; 14, gear teeth; 15, teeth-uncompleted gear; 16, spring; 17, tapered tube; 18, spiral shaft; 19, stirring rod; 20, spiral blade; 21, small housing; 22, feed cavity; 23, horizontal rod; 24, feed port; 25, auger; 26, sealing plate; 27, third motor; 28, discharge port; 29, rotating ring; 30, rotating annular groove; 31, discharge bin; 32, fourth motor; 33, anode electrode; 34, cathode electrode; 35, sluice gate plate; 36, sluice gate; 37, sluice gate passage; 38, elastic spring; 39, T-shaped rod; 40, water outlet; 41, plug; 42, wastewater tank; 43, sponge layer.

DETAILED DESCRIPTION OF THE EMBODIMENTS

The technical solutions in the embodiments of the present invention will be described clearly and completely with reference to the drawings in the embodiments of the present invention. Obviously, the described embodiments are only a part of the embodiments of the present invention rather than all the embodiments. Based on the embodiments of the present invention, all other embodiments obtained by those having ordinary skill in the art without creative efforts shall fall within the scope of protection of the present invention.

Referring to FIGS. 1-6, an apparatus for remediation of a copper and nickel co-contaminated soil includes the housing 1. The crushing device 2 is arranged at the upper part of the inside of the housing 1.

The sliding block 3 is connected to both sides of the middle of the outer surface of the crushing device 2. The slide channel 4 matched with the sliding block is provided at the upper part of the inner wall of the housing 1. The crushing device 2 is slidably connected to the slide channel 4 through the sliding block 3.

The support rod 5 is arranged at the upper part of the inside of the crushing device 2, and both ends of the support rod 5 are fixedly connected to the inner wall of the crushing device 2. The first motor 6 is fixedly connected to the middle of the upper surface of the support rod 5. The output shaft 7 of the first motor 6 penetrates the support rod 5 and is connected to a crushing rod.

Figure 1:
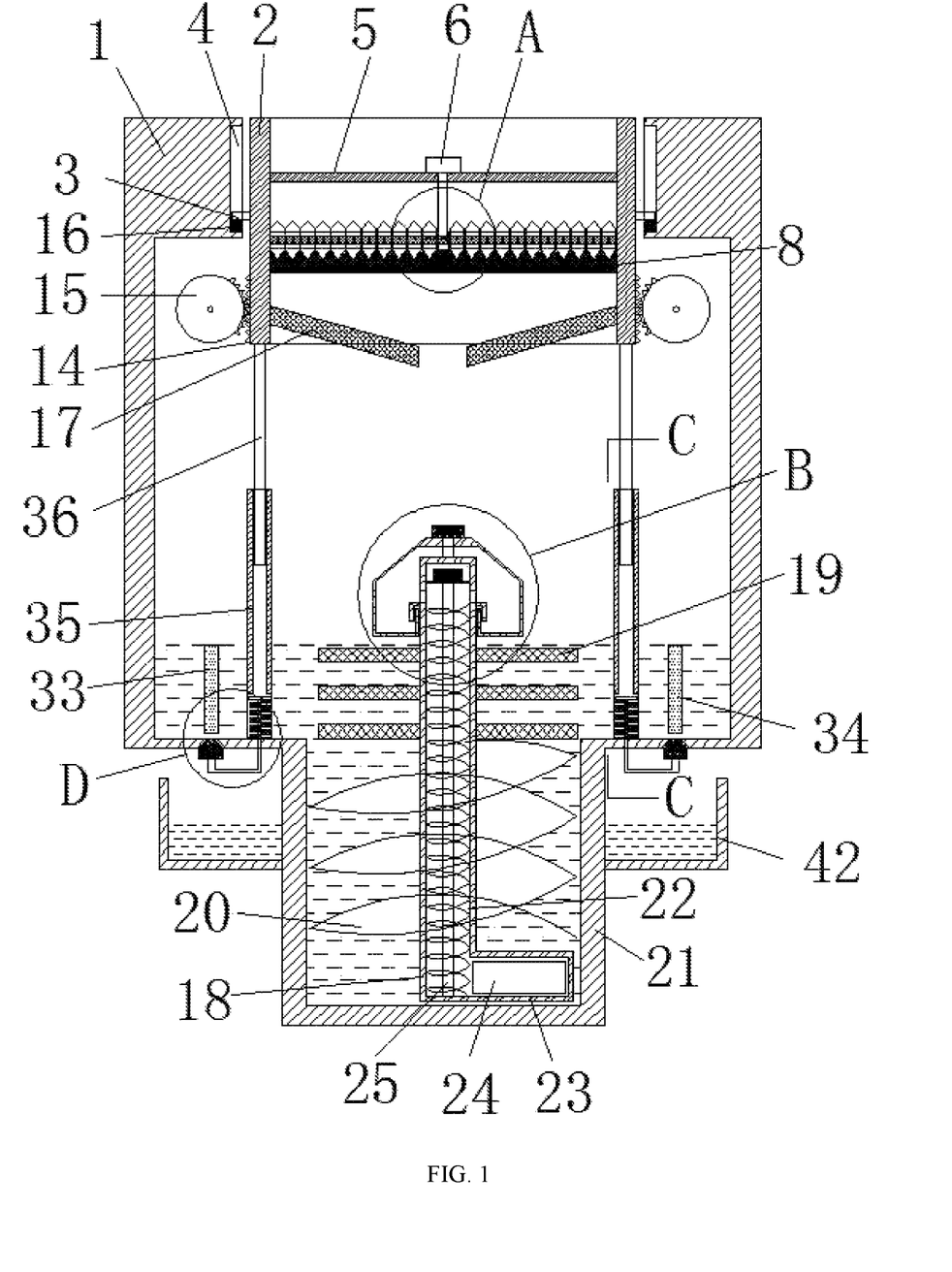
FIG. 1 is a cross-sectional view of the structure of the present invention.
Figure 2:
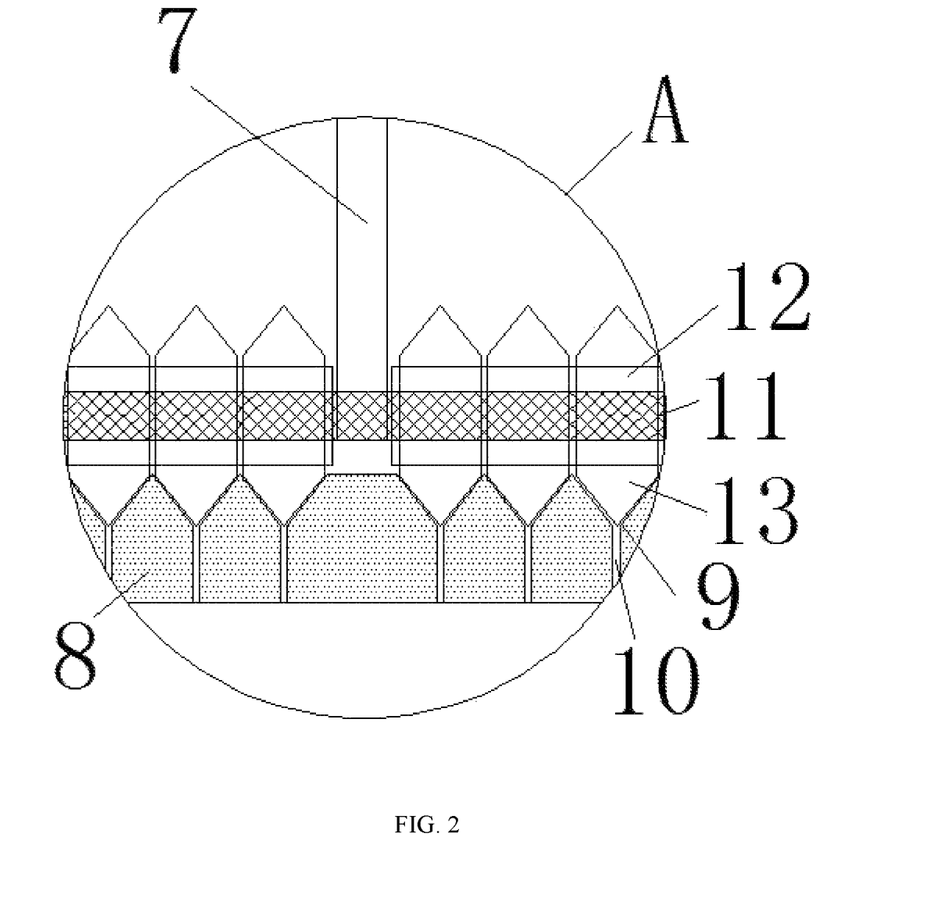
FIG. 2 is an enlarged view of portion A encircled in FIG. 1 according to the present invention.
Figure 3:
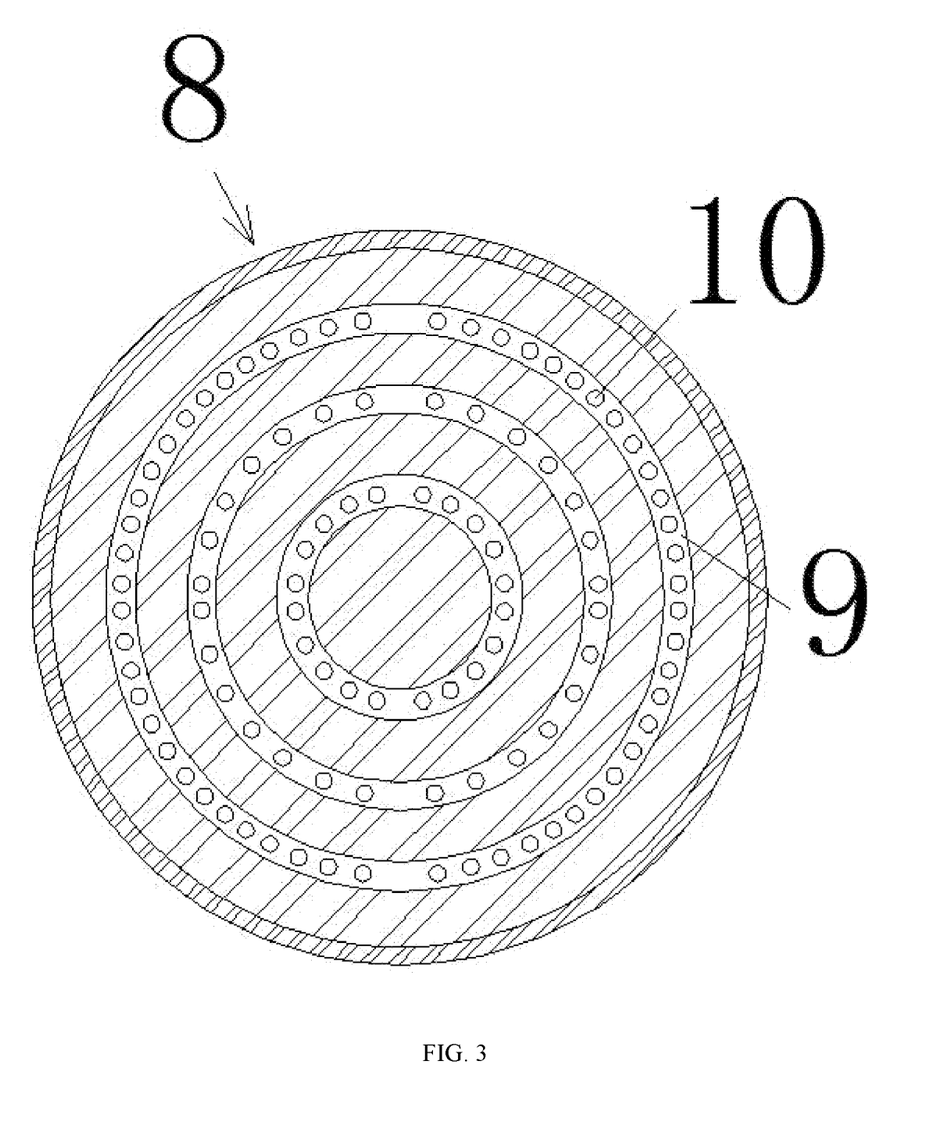
FIG. 3 is a schematic view of the structure of the upper surface of the crushing disc according to the present invention.
Figure 4:
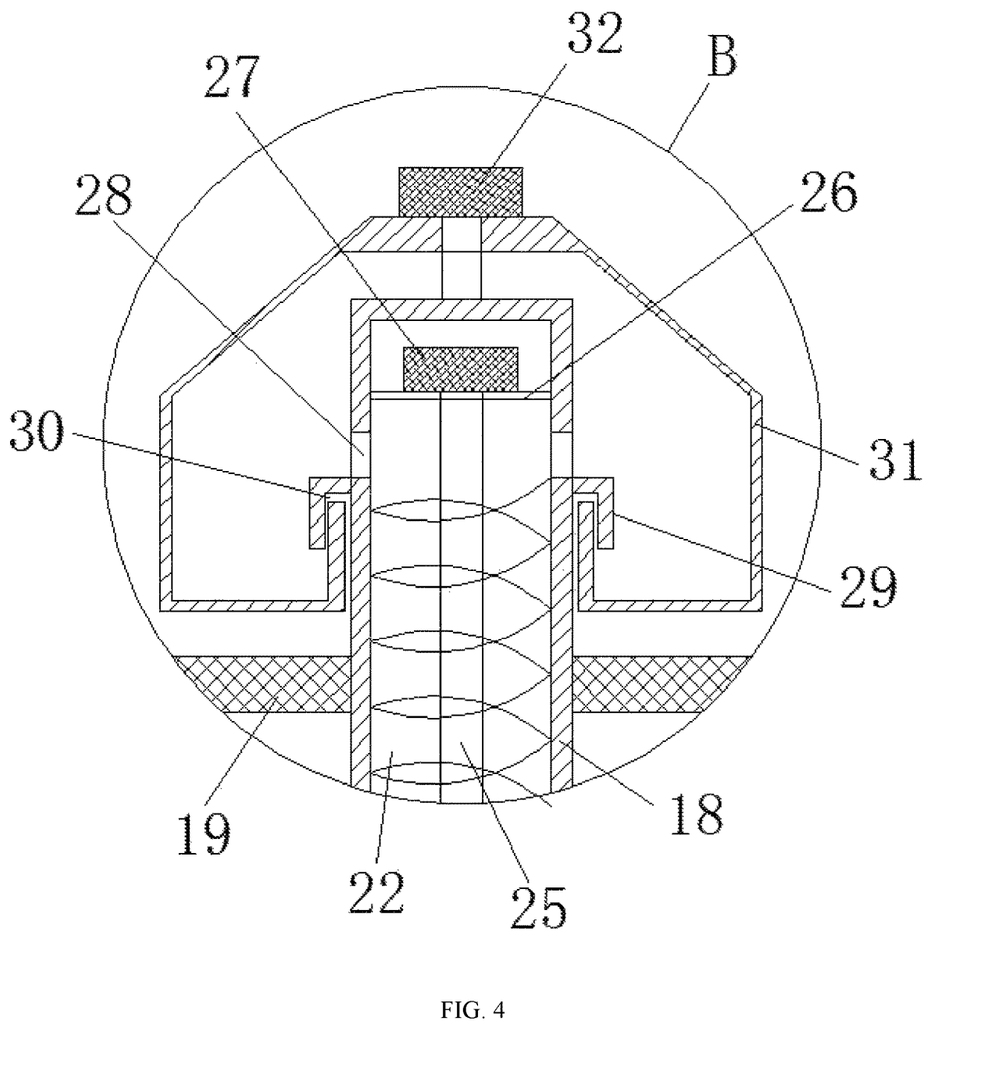
FIG. 4 is an enlarged view of portion B encircled in FIG. 1 according to the present invention.
Figure 5:
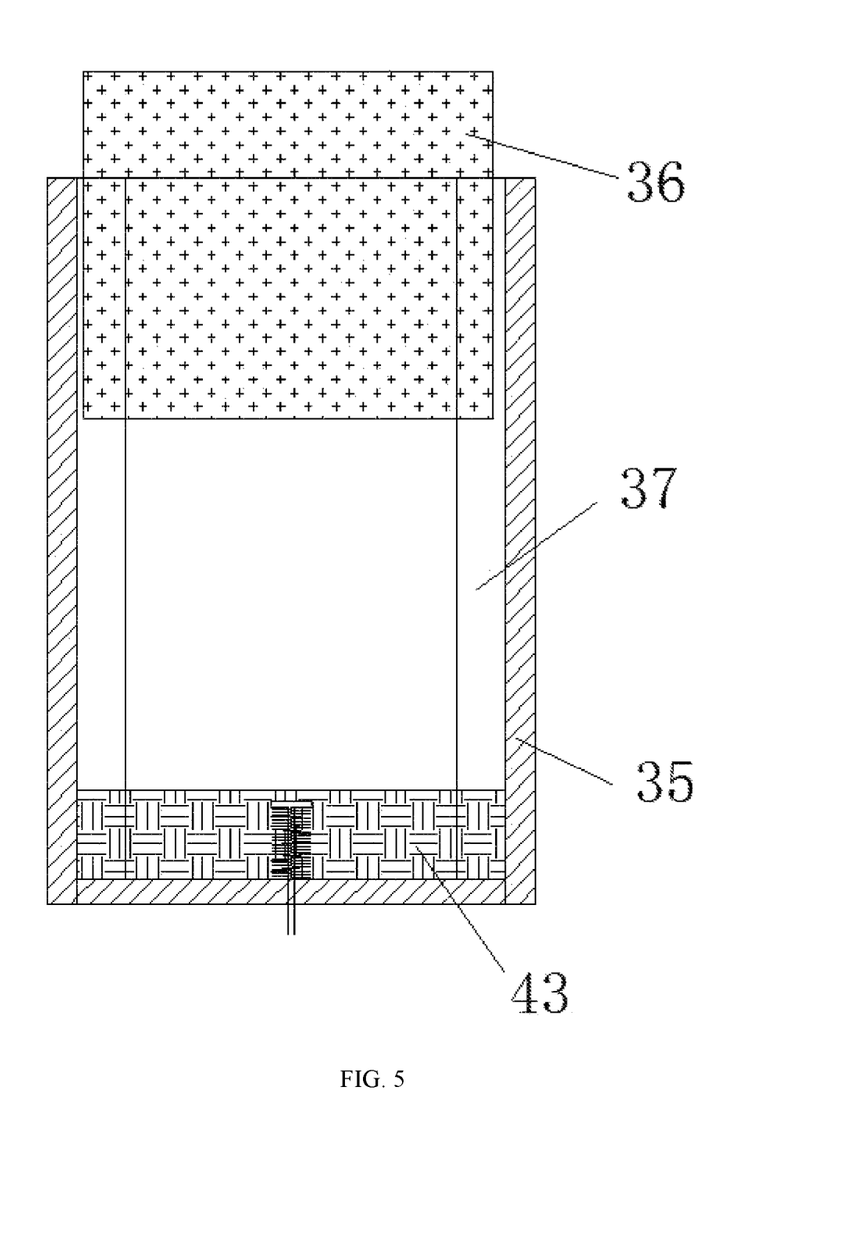
FIG. 5 is a cross-sectional view taken along line C-C in FIG. 1 according to the present invention.
Figure 6:
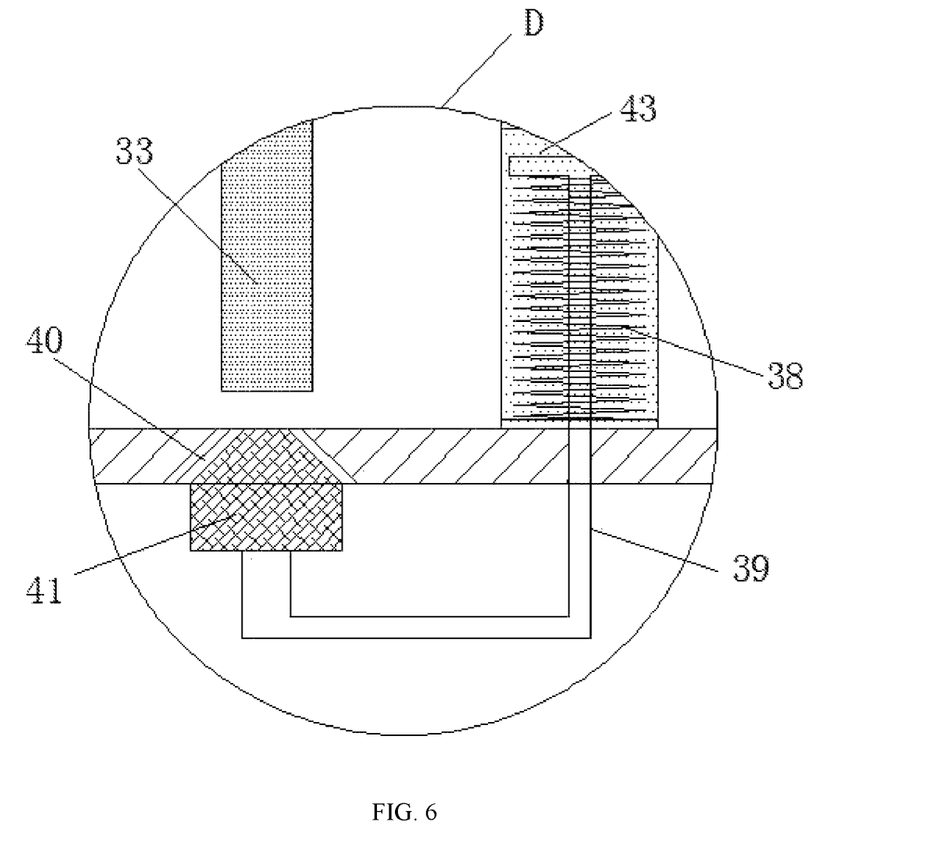
FIG. 6 is an enlarged view of portion D encircled in FIG. 1 according to the present invention.

The crushing disc 8 is arranged under the crushing rod, and the edge of the crushing disc 8 is fixedly connected to the inner wall of the crushing device 2. The upper surface of the crushing disc 8 is provided with a plurality of concentric crushing grooves 9. The crushing groove 9 is provided with a plurality of through holes 10. The through holes 10 penetrate the crushing disc 8.

The crushing rod includes the fixed rod 11 and the roller 12, and the middle of the fixed rod 11 is fixedly connected to the bottom end of the output shaft 7. The roller 12 is sleeved on both sides of the fixed rod 11, and the outer surface of the roller 12 is provided with crushing teeth 13 matched with the crushing grooves 9.

The gear teeth 14 are provided on both sides of the bottom end of the outer surface of the crushing device 2, and the gear teeth 14 mesh with the teeth-uncompleted gear 15. Two second motors are provided outside the housing 1, and rotating shafts of the two second motors are separately connected to the teeth-uncompleted gears 15.

A dry soil contaminated by copper and nickel is poured from the top of the crushing device, and falls on the crushing disc. Then, the roller is driven by the first motor to roll, such that the crushing teeth crush the agglomerated soil in the crushing grooves, and the crushed soil that meets a certain size discharges from the through holes to the bottom. In order to prevent the soil from clogging, the second motor drives the teeth-uncompleted gear to rotate, so that the teeth-uncompleted gears on both sides of the crushing devices mesh with the gear teeth to synchronously drive the crushing devices to ascend and then descend automatically, thereby vibrating the soil. The soil is revibrated under the action of the spring and thus falls more smoothly. In this way, the crushed soil falls between the sluice gate devices on both sides through the tapered tube.

A stirring device is arranged below the crushing device 2, and the stirring device includes the spiral shaft 18. One end of each of a plurality of stirring rods 19 is fixedly connected to the upper side of the spiral shaft 18. A lower side of the spiral shaft 18 is connected to the spiral blade 20. The small housing 21 is connected to the middle of the lower surface of the housing 1. The spiral blade 20 is located inside the small housing 21 and contacts the inner wall of the small housing 21.

The feed cavity 22 is formed inside the spiral shaft 18, and the horizontal rod 23 is connected to a side of the bottom end of the spiral shaft 18. One end of the horizontal rod 23 is perpendicularly connected to the spiral shaft 18, and the other end of the horizontal rod 23 contacts the inner wall of the small housing 21. The lower surface of the horizontal rod 23 contacts the inner bottom surface of the small housing 21. The horizontal rod 23 is provided with the feed port 24, and the feed port 24 communicates with the feed cavity 22. The auger 25 is arranged inside the feed cavity 22, and the auger 25 contacts the inner wall of the feed cavity 22.

The top of the feed cavity 22 is provided with the sealing plate 26, and the edge of the sealing plate 26 is fixedly connected to the inner wall of the feed cavity 22. The third motor 27 is arranged on the sealing plate 26. The third motor 27 penetrates the sealing plate 26 and is connected to the top end of the auger 25.

The discharge port 28 is provided at the upper part of the spiral shaft 18. The rotating ring 29 is arranged below the discharge port on the outer surface at the upper part of the spiral shaft 18. The rotating annular groove 30 is provided on a side of the rotating ring 29 adjacent to the spiral shaft 18. The top end of the spiral shaft 18 is located inside the discharge bin 31, and the lower part of the discharge bin 31 is located inside the rotating annular groove 30. The fourth motor 32 is provided on the top end of the outer surface of the discharge bin 31. The fourth motor 32 penetrates the top end of the discharge bin 31 and is connected to the spiral shaft 18. The outer surface of the discharge bin 31 is fixedly connected to the inner wall of the housing 1 through a supporting column.

The anode electrode 33 and the cathode electrode 34 are provided at both ends of the inner bottom of the housing 1, respectively. A sluice gate device is provided between the anode electrode 33 and the stirring rod 19, and between the cathode electrode 34 and the stirring rod 19. The sluice gate device includes two sluice gate plates 35 and the sluice gate 36. One side of the two sluice gate plates 35 is fixedly connected to the inner wall of the housing 1. The sluice gate passage 37 is provided on opposite sides of the two sluice gate plates. The bottom end of the sluice gate 36 is slidably arranged inside the sluice gate passage 37, and the top end of the sluice gate 36 is fixedly connected to the lower surface of the crushing device 2.

The sponge layer 43 is connected between the bottoms of the opposite sides of the two sluice gate plates 35. The elastic spring 38 and the T-shaped rod 39 are arranged inside the sponge layer 43, and the T-shaped rod 39 is located inside the elastic spring 38.

The housing 1 is provided with the tapered water outlet 40 under the anode electrode 33 and the tapered water outlet 40 under the cathode electrode 34. The water outlet 40 is provided with the truncated cone-shaped plug 41. The bottom end of the T-shaped rod 39 penetrates the lower part of the housing 1 and is connected to the lower surface of the plug 41 through a connecting rod.

The wastewater tank 42 is arranged below the water outlet 40, and the wastewater tank 42 is fixedly connected to the outer wall of the small housing 21.

The first motor 6, the second motor, the third motor 27, the fourth motor 32, the anode electrode 33 and the cathode electrode 34 are all electrically connected to a power source.

The crushed soil is quickly mixed with an aqueous solution under the action of the stirring rod. The liquid level of the aqueous solution is higher than the stirring rod but lower than the bottom of the discharge bin. After being quickly mixed with the aqueous solution, the copper and nickel ions in the soil are quickly attracted by the cathode electrode or the anode electrode, so that all the heavy metal ions are accumulated around the cathode electrode or the anode electrode. After that, when the crushing device is lowered, the sluice gate is driven to close the sluice gate device (which may be incompletely closed, as long as the water discharge speed at the water outlet is faster than the water inlet speed). Subsequently, the T-shaped rod is squeezed to drive the plug to descend, so that the water around the cathode electrode or the anode electrode enters the wastewater tank. In this way, part of the aqueous solution with a high concentration of heavy metals in the aqueous solution is removed, which overcomes the problem that the heavy metal ions are inclined to run away from the cathode electrode or the anode electrode due to the difference in concentration. By means of the present invention, heavy metal ions are quickly removed, and the efficiency of attracting the heavy metal ions by the anode electrode and the cathode electrode is significantly improved, thereby improving the efficiency of soil remediation. In addition, the soil enters below the stirring rod, then enters the feed cavity through the horizontal rod, and then ascends into the discharge bin under the action of the auger. After that, the remedied soil is taken out from the discharge bin.

The bottom of the sliding block 3 and the bottom of the slide channel 4 are fixedly connected to the two ends of the spring 16, respectively.

The tapered tube 17 is provided on the lower side of the crushing disc 8, and the upper part of the tapered tube 17 is fixedly connected to the inner wall of the crushing device 2.

One end of a screw conveyor is arranged inside the discharge bin 31. The other end of the screw conveyor penetrates the discharge bin 31 and the housing 1, and then extends outward. The screw conveyor is connected to the power source.

An opening and closing door is provided on the outer surface of the housing 1 directly opposite to the discharge bin 31.

A method for using the apparatus includes:

step (1), the first motor 6, the second motor, the third motor 27, the fourth motor 32, the anode electrode 33 and the cathode electrode 34 are activated, and then a dry contaminated soil is poured from the top of the crushing device 2; and step (2), the remedied soil is taken out from the discharge bin 31.

In the present invention, the soil after being poured is automatically treated, and then the remedied soil is directly taken out from the discharge bin, the apparatus is fully automatic and has high remediation efficiency.

The above description is only the preferred specific implementation of the present invention, but the scope of protection of the present invention is not limited thereto. Equivalent replacements or changes made by any person familiar with the technical field in the technical scope disclosed by the present invention according to the technical solution of the present invention and its improvement concept shall fall within the scope of protection of the present invention.

What is claimed is:

1. An apparatus for remediation of a copper and nickel co-contaminated soil, comprising a housing; wherein
   - a crushing device is arranged at an upper part of an inside of the housing;
   - a sliding block is connected to both sides of a middle of an outer surface of the crushing device, a slide channel matched with the sliding block is provided at an upper part of an inner wall of the housing, and the crushing device is slidably connected to the slide channel through the sliding block;
   - a support rod is arranged at an upper part of an inside of the crushing device, and both ends of the support rod are fixedly connected to an inner wall of the crushing device; a first motor is fixedly connected to a middle of an upper surface of the support rod; an output shaft of the first motor penetrates the support rod and is connected to a crushing rod;
   - a crushing disc is arranged under the crushing rod, and an edge of the crushing disc is fixedly connected to the inner wall of the crushing device; an upper surface of the crushing disc is provided with a plurality of concentric crushing grooves, and each of the plurality of concentric crushing grooves is provided with a plurality of through holes; the plurality of through holes penetrate the crushing disc;
   - the crushing rod comprises a fixed rod and a roller, and a middle of the fixed rod is fixedly connected to a bottom end of the output shaft; the roller is sleeved on both sides of the fixed rod, and an outer surface of the roller is provided with crushing teeth matched with the plurality of concentric crushing grooves;
   - gear teeth are provided on both sides of a bottom end of the outer surface of the crushing device, and the gear teeth mesh with a teeth-uncompleted gear; two second motors are provided outside the housing, and rotating shafts of the two second motors are separately connected to the teeth-uncompleted gears;
   - a stirring device is arranged below the crushing device, and the stirring device comprises a spiral shaft; an upper side of the spiral shaft is fixedly connected to one end of each of a plurality of stirring rods, and a lower side of the spiral shaft is connected to a spiral blade; a small housing is connected to a middle of a lower surface of the housing; the spiral blade is located inside the small housing and contacts an inner wall of the small housing;
   - a feed cavity is formed inside the spiral shaft, and a vertical rod is connected to a side of a bottom end of the spiral shaft; a first end of the vertical rod is perpendicularly connected to the spiral shaft, and a second end of the vertical rod contacts the inner wall of the small housing; a lower surface of the vertical rod contacts an inner bottom surface of the small housing; the vertical rod is provided with a feed port, and the feed port communicates with the feed cavity; an auger is arranged inside the feed cavity, and the auger contacts an inner wall of the feed cavity;
   - a top of the feed cavity is provided with a sealing plate, and an edge of the sealing plate is fixedly connected to the inner wall of the feed cavity; a third motor is arranged on the sealing plate; the third motor penetrates the sealing plate and is connected to a top end of the auger;
   - a discharge port is provided at an upper part of the spiral shaft, and a rotating ring is arranged below the discharge port on an outer surface at the upper part of the spiral shaft; a rotating annular groove is provided on a side of the rotating ring, wherein the side of the rotating ring is adjacent to the spiral shaft; a top end of the spiral shaft is located inside a discharge bin, and a lower part of the discharge bin is located inside the rotating annular groove; a fourth motor is provided on a top end of an outer surface of the discharge bin, and the fourth motor penetrates the top end of the discharge bin and is connected to the spiral shaft; the outer surface of the discharge bin is fixedly connected to the inner wall of the housing through a supporting column;
   - an anode electrode and a cathode electrode are provided at both ends of an inner bottom of the housing, respectively; a sluice gate device is provided between the anode electrode and the plurality of stirring rods, and between the cathode electrode and the plurality of stirring rods; the sluice gate device comprises two sluice gate plates and a sluice gate; one side of the two sluice gate plates is fixedly connected to the inner wall of the housing; a sluice gate passage is provided on opposite sides of the two sluice gate plates; a bottom end of the sluice gate is slidably arranged inside the sluice gate passage, and a top end of the sluice gate is fixedly connected to a lower surface of the crushing device;
   - a sponge layer is connected between bottoms of the opposite sides of the two sluice gate plates; an elastic spring and a T-shaped rod are arranged inside the sponge layer, and the T-shaped rod is located inside the elastic spring;
   - the housing is provided with a first tapered water outlet under the anode electrode and a second tapered water outlet under the cathode electrode; each of the first tapered water outlet and the second tapered water outlet is provided with a truncated cone-shaped plug; a bottom end of the T-shaped rod penetrates a lower part of the housing and is connected to a lower surface of the truncated cone-shaped plug through a connecting rod;
   - a wastewater tank is arranged below each of the first tapered water outlet and the second tapered water outlet, and the wastewater tank is fixedly connected to an outer wall of the small housing; and
   - the first motor, the two second motors, the third motor, the fourth motor, the anode electrode and the cathode electrode are all electrically connected to a power source.

2. The apparatus for the remediation of the copper and nickel co-contaminated soil according to claim 1, wherein, a bottom of the sliding block and a bottom of the slide channel are fixedly connected to two ends of a spring, respectively.

3. The apparatus for the remediation of the copper and nickel co-contaminated soil according to claim 1, wherein,
a tapered tube is provided on a lower surface of the crushing disc, and an upper part of the tapered tube is fixedly connected to the inner wall of the crushing device.

4. The apparatus for the remediation of the copper and nickel co-contaminated soil according to claim 1, wherein,
a first end of a screw conveyor is arranged inside the discharge bin;
a second end of the screw conveyor penetrates the discharge bin and the housing, and then the second end of the screw conveyor extends outward; and
the screw conveyor is connected to the power source.

5. The apparatus for the remediation of the copper and nickel co-contaminated soil according to claim 1, wherein,
an opening and closing door is provided on an outer surface of the housing, wherein the outer surface of the housing is directly opposite to the discharge bin.

6. A method for using the apparatus for the remediation of the copper and nickel co-contaminated soil according to claim 1, comprising:
step (1), activating the first motor, the two second motors, the third motor, the fourth motor, the anode electrode and the cathode electrode, and then pouring a dry contaminated soil from a top of the crushing device; and
step (2), taking out a remedied soil from the discharge bin.

7. The method according to claim 6, wherein,
a bottom of the sliding block and a bottom of the slide channel are fixedly connected to two ends of a spring, respectively.

8. The method according to claim 6, wherein,
a tapered tube is provided on a lower surface of the crushing disc, and an upper part of the tapered tube is fixedly connected to the inner wall of the crushing device.

9. The method according to claim 6, wherein,
a first end of a screw conveyor is arranged inside the discharge bin;
a second end of the screw conveyor penetrates the discharge bin and the housing, and then the second end of the screw conveyor extends outward; and
the screw conveyor is connected to the power source.

10. The method according to claim 6, wherein,
an opening and closing door is provided on an outer surface of the housing, wherein the outer surface of the housing is directly opposite to the discharge bin.

* * * * *